United States Patent
Brusky et al.

[11] Patent Number: 5,903,259
[45] Date of Patent: May 11, 1999

[54] METHOD AND APPARATUS FOR MAPPING REMOTE CONTROL BUTTONS ONTO KEYBOARD STROKE COMBINATIONS

[75] Inventors: Kevin J. Brusky, Magnolia; John W. Frederick; Jeffrey T. Lininger, both of Spring, all of Tex.

[73] Assignee: Compaq Computer Corporation, Houston, Tex.

[21] Appl. No.: 08/829,049

[22] Filed: Mar. 31, 1997

[51] Int. Cl.6 ...................................................... G09G 5/00
[52] U.S. Cl. .......................... 345/168; 345/169; 348/734
[58] Field of Search .................................. 345/168, 169; D14/115; 341/22, 23; 395/821–894; 348/734

[56] References Cited

U.S. PATENT DOCUMENTS

| | | | |
|---|---|---|---|
| 5,189,543 | 2/1993 | Lin et al. ................................. | 359/142 |
| 5,282,028 | 1/1994 | Johnson et al. ............................ | 358/86 |
| 5,307,297 | 4/1994 | Iguchi et al. ......................... | 345/169 X |
| 5,450,079 | 9/1995 | Dunaway ................................... | 341/23 |
| 5,485,614 | 1/1996 | Kocis et al. ......................... | 395/893 X |
| 5,552,837 | 9/1996 | Mankovitz .............................. | 348/734 |
| 5,602,854 | 2/1997 | Luse et al. ............................. | 370/313 |
| 5,650,831 | 7/1997 | Farwell ................................... | 348/734 |

Primary Examiner—Steven J. Saras
Assistant Examiner—Seth D. Vail
Attorney, Agent, or Firm—Jenkens & Gilchrist

[57] ABSTRACT

A computer system having a wireless keyboard which transmits make-break signals to the computer system. The wireless keyboard and/or computer system being adapted to have television (or other remotely controllable devices) commands mapped into the wireless keyboard such that the wireless keyboard can provide standard computer keyboard commands to the computer and also remotely control another remotely controllable device.

17 Claims, 3 Drawing Sheets

METHOD AND APPARATUS FOR MAPPING REMOTE CONTROL BUTTONS ONTO KEYBOARD STROKE COMBINATIONS

BACKGROUND OF THE INVENTION

1. Field of the Invention

The present invention relates to a wireless computer keyboard device which incorporates the functionality of a wireless remote. More particularly, the present invention relates to a computer system that has a computer mode and at least one other mode, such as a television (TV) mode, game mode, video phone mode, et cetera, that incorporates a wireless remote control and/or a wireless keyboard wherein the wireless remote control functionality can be accessed from the wireless keyboard.

2. Background of the Invention

A personal computer/television (PC/TV) convergence device is a fully functional computer integrated with television functionality, providing TV viewing (via broadcast, cable, satellite, VCR, digital disk, via modem, VBI, or other broadcast media) and personal computing functionality. The convergence of computer and television functionalities provides a user access to television programs, to computer related functionality, and to the Internet.

A PC/TV convergence device may comprise a fully functional computer which includes memory, a microprocessor, hard drive, floppy drive, fax-modem, CD-ROM player, keyboard, monitor, power supply, mouse, gamepad/joy stick, microphone, USB, DVD player, etc. The computer is interfaced with a television functionality module so that a television's/monitor's normal National Television Standards Committee (NTSC) signal is converted to a scan "video graphics adapter" (VGA) signal or the computer's scan VGA signal is converted to an NTSC interface signal.

The PC/TV convergence device is controlled by the computer's operating system (OS). Thus, the monitor can display both TV programs and computer applications either at the same time or separately. Furthermore, the convergence of a PC and TV functions into a single system permits the utilization of the communications bandwidth, mass storage and graphics applications of the computer to deliver, store and display applications within a television viewing environment.

The PC/TV is a user interactive device. For example, when a user is watching TV he can interact with the program and download information from another source (besides a TV station) about, among other things, the program being watched. Such information can originate from a web site or via phone lines or other data providers.

At present, when a television and a personal computer operate as separate devices, the TV may incorporate a remote control. A standard TV remote control may control a variety of functions of or related to a TV. The remote control transmits infrared (IR) signals to the TV indicating which button on the remote control was pressed.

There also exists wireless keyboards for use with a personal computer. One example of a wireless keyboard is and IR keyboard. An IR keyboard allows a user to operate the computer without a wire connection between the IR keyboard and the computer. When a key is pressed on an IR keyboard, an IR "make" signal may be repetitiously sent from the keyboard IR transmitter and be received by an IR receiver on or connected to the computer. When the same key is released from being pressed, an IR "break" signal associated with the key is transmitted from the IR keyboard to the computer. The combination of the make and break signals informs the computer that the key on the IR keyboard was pressed, held for a certain amount of time and then released.

One of ordinary skill in the art would understand that the transmissions from an IR remote control and an IR keyboard are formatted differently. And, if a computer and a television are combined or converged into a single device, present devices would require a separate IR remote control and an IR keyboard to operate the two converged systems.

Thus, a problem associated with combining a computer with a TV system (or any remote controlled device) is that a separate remote control is necessary to remotely operate the non-computer device and a wireless (IR) keyboard may be required to operate the computer. In other words, the IR computer keyboard could not be used to control the remotely controlled device.

Another drawback is that present IR keyboards do not provide infrared signals that are the same as those produced by present day IR remote control devices.

Another drawback is that remote control commands are not presently mapped into an IR computer keyboard.

SUMMARY OF THE INVENTION

In view of the limitations and shortcomings of the aforementioned separate IR remote control and wireless computer keyboard, as well as other disadvantages not specifically mentioned above, it is apparent that there exists a need for a wireless or IR keyboard that is adapted to send standard make-break signals to an IR receiver associated with a computer, but also be adapted to transmit IR signals in a format that can be accepted and understood by an IR receiver associated with a television, VCR, CD player, stereo system or other remotely controlled device that is either associated with the computer or separate from the computer.

The present invention may provide schemes to map non-computer related remote commands into a wireless keyboard so that a converged electronic device can be controlled by a computer when the mapped commands are received by the computer from the computer keyboard.

The present invention may also provide an IR, RF or otherwise wireless keyboard for use with a computer that emulates wireless transmission of an IR, RF or otherwise wireless remote control device. In embodiments of the present invention a predetermined key can be programmed to transmit a signal normally transmitted by a wireless remote.

According to the teachings of the present invention, IR remote control functions are mapped into an IR (wireless) keyboard so that either a single key press or when a key combination is pressed on the wireless keyboard, the wireless keyboard produces the same signal that a wireless remote produces or the wireless keyboard produces a signal that is interpreted by the computer to be related to the converged electronic device. In other words, the present invention may provide a wireless keyboard wherein a single key or multiple key press on the keyboard produces a wireless transmission that is equivalent to that of a wireless remote.

BRIEF DESCRIPTION OF THE DRAWINGS

Other features and characteristics of the present invention as well as methods of operation and functions of related elements of structure, and the combination of parts and economies of manufacture, will become apparent upon consideration of the following description and appended claims with reference to the accompanying drawings, all of which form a part of this specification wherein like reference numerals designate corresponding parts in the various figures, and wherein:

DETAILED DESCRIPTION OF THE PRESENTLY PREFERRED EXEMPLARY EMBODIMENTS

Figure 1:
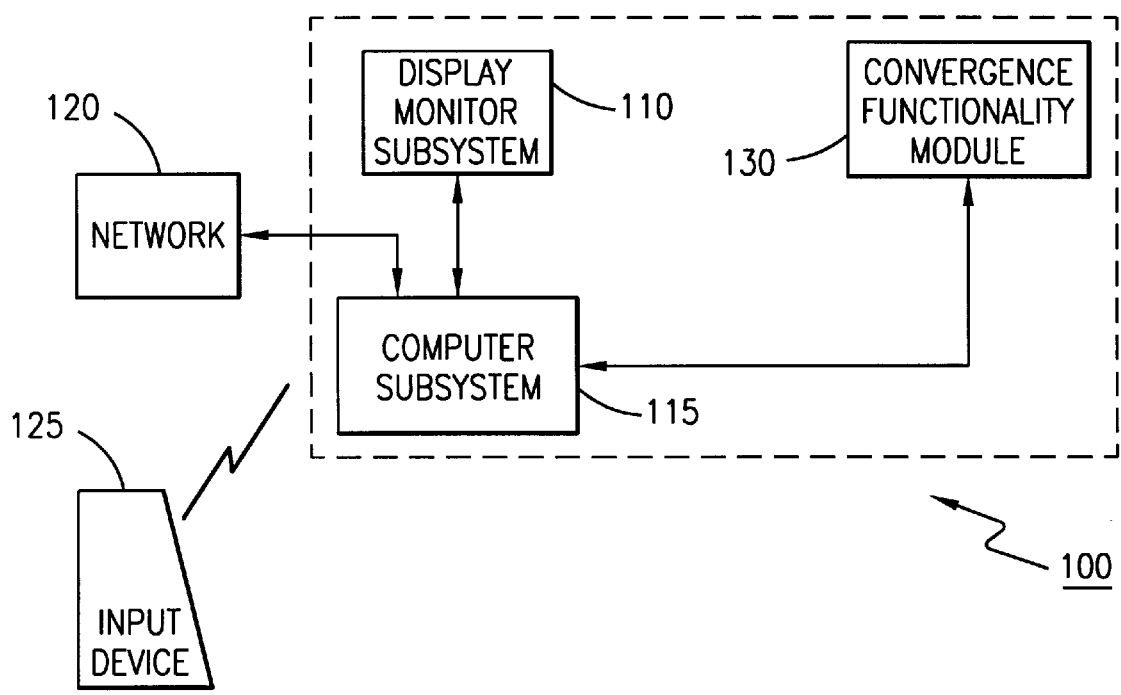
FIG. 1 is an exemplary block diagram of an embodiment of a convergence device in accordance with the teachings of the present invention.

Referring now to the drawings wherein like or similar elements are designated with identical reference numerals throughout the several views, and wherein the various elements depicted are not necessarily drawn to scale, and in particular, to FIG. 1, there is shown a block diagram of a convergence device system 100 utilizing the teachings of the present invention. This block diagram illustrates features of the present invention and basic principles of operation of an exemplary embodiment. The block diagram is not necessarily intended to schematically represent specific modules of hardware or any particular data or control paths therebetween.

The convergence device system 100 includes a first subsystem, a display monitor subsystem 110, operable to receive and display thereon display signals received from a second subsystem, a computer subsystem 115. Although not depicted, the subsystem 115 comprises a processor unit coupled to a storage unit, and may further preferably contain a communication port for enabling communication between the convergence device system 100 and a network 120.

The network 120, it is understood, can be any network, for example, a local network, a telephone communication system, a metropolitan area network, a wide area network, an intranet, or an internet network. The computer subsystem 115 is connected to a convergence functionality module 130 that is adapted to receive and/or provide various combinations of composite RF, video, audio, graphics and/or data signals. For example, the module 130 may comprise a receiver for receiving TV signals in any form, such as National Television Standards Committee (NTSC) form or the Phase Alteration Line (PAL) form, via any medium, digital or analog, such as a cable system, a digital satellite system or a network broadcast medium.

In another embodiment, the module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals are selected to be forwarded to drive suitable output devices, for example, the display monitor system 110 and/or an audio output device (not specifically shown).

Although the module 130 and the subsystem 115 are shown to be two separate yet interconnected entities, the module 130 may, in some embodiments of the present invention, be integrated into subsystem 115. Such an integrated subsystem may comprise in a single housing for one or more video sources (or consumer/home electronics units including receivers for TV signals, gaming units, video telephoning units, etc.), a video control device or means for managing and selecting among these sources and for generating appropriate display signals to be provided to suitable output devices, a processor, and data storage devices.

The convergence device system 100 may be operable with an input device 125. The input device may comprise any of the following: a remote control, a standard TV remote control, a remote track-ball/mouse device, a remote pointing device, a wireless keyboard, a wired keyboard, a keyboard integrated with a pointing device or a standard remote control device, etc. Furthermore, one of ordinary skill in the art would understand that convergence device systems 100 may contain hardware modules which include, but are not limited to, power supply module, TV tuner circuitry, video imaging circuitry, microphone/audio circuitry, CD-ROM devices, scanning devices, facsimile devices, etc.

Referring now to remote control devices, a generic consumer electronic remote control for, for example, a remote control for a television, may have standardized keys and specialized keys. A standardized key may be a button for channel-up, channel-down, volume-up, and volume-down. When a button is pressed, for example an up-channel key, the remote transmits an up-channel infrared (IR) signal to the television. The up-channel signal received by the TV indicates that the up-channel button has been pressed. The remote does not send a different signal when the up-channel signal has been released.

Another example of a remote signal is the volume-up signal. When a user presses a volume up button on the remote, the remote may send a volume-up signal repetitiously to the television until the user releases the volume-up button. In response thereto, the television will increase the volume output in accordance with a new volume setting.

Conversely, a wireless computer keyboard operates very similarly to a regular (electrically connected) computer keyboard in that when a key is pressed on a wireless computer keyboard a "make" signal is repetitiously sent to the computer indicating that the particular key is being pressed. When the key is depressed, a different signal, a "break" signal, is sent from the keyboard to the computer indicating that the particular key has been released.

Figure 2:
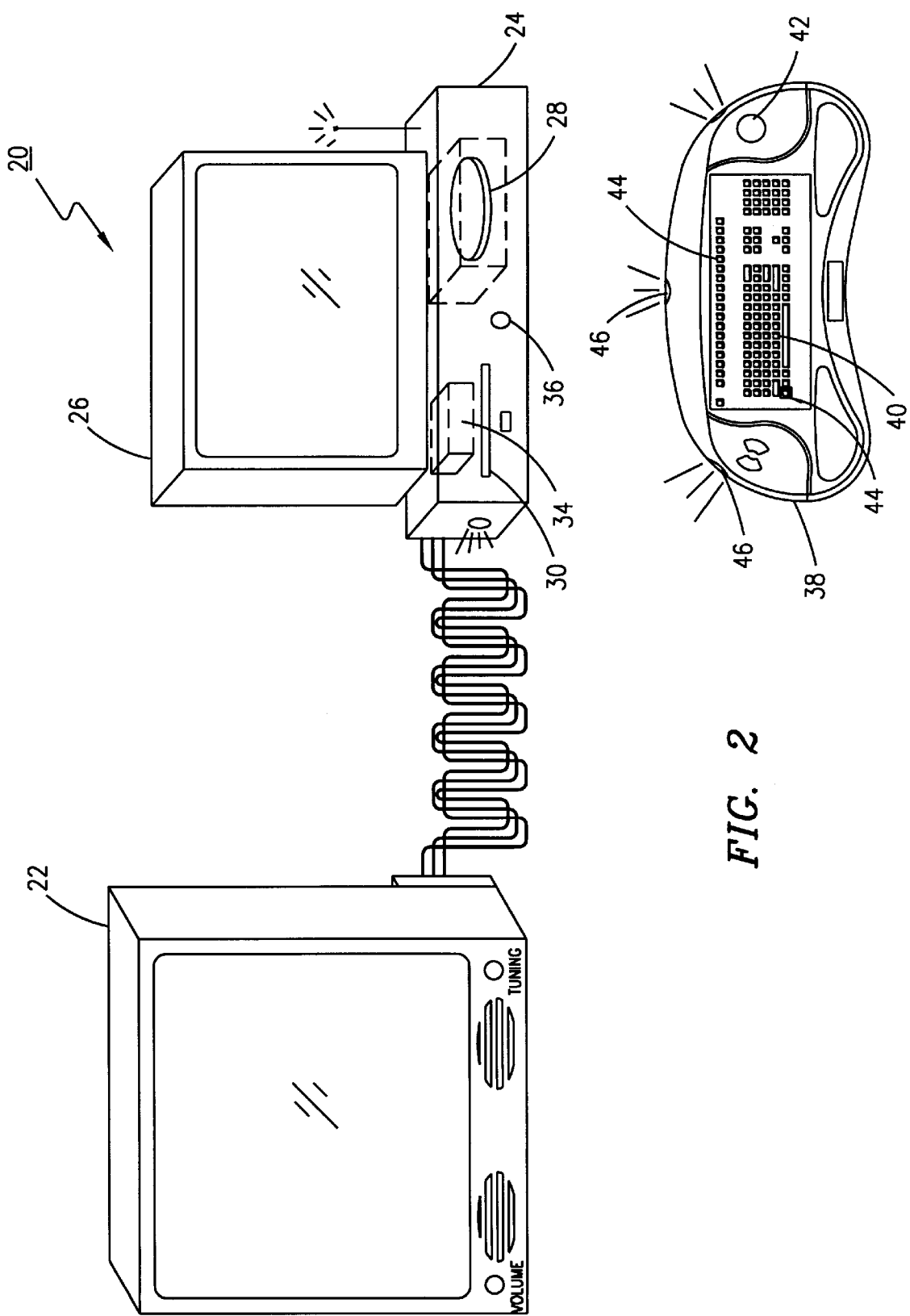
FIG. 2 is a drawing of an exemplary embodiment of a PC/TV System.

Referring now to FIG. 2, there is depicted an exemplary embodiment of a personal computer converged with another electronic system 20. In FIG. 2 the personal computer is converged with a television system. It is understood that the personal computer could be converged with or be connected with a variety of other electronic devices. Such electronic devices include, but are not limited to, a video player; a digital disc player; a compact disk player; a RF tuner, cable tuner or satellite tuner; a telecommunication device such as a cell phone or video phone; and a gaming device such as a Sega® game system or Sony® game system.

In FIG. 2 the personal computer or CPU converged with the television comprises a monitor 22 which is connected by wires or a VGA bus to the CPU 24 of the personal computer. The CPU 24 may have another monitor 26 connected to it. The CPU may also comprise a hard drive 28, a CD ROM player, a floppy disk drive 30, and a microprocessor.

In this exemplary embodiment, the CPU 24 comprises a television tuner and control circuitry 34 and an IR receiver 36. Thus, the functionality of a television is converged into the exemplary CPU 24.

A wireless computer keyboard 38 is shown. The wireless computer keyboard 38 comprises alphanumeric keys 40; a trackball, mouse or other curser maneuvering mechanism 42, miscellaneous function keys 44 and at least one IR transmitter 46.

The exemplary CPU may incorporate a window based operating system such that the user of the system may run various software based programs simultaneously. Preferably, the exemplary PC/TV system can operate in a first mode which is exclusively a TV viewing mode wherein the system operates as if it were a present day TV. Furthermore, the exemplary PC/TV can operate in a second mode which is a computer or PC mode wherein the system operates under the guidance of a computer operating system, such as Windows 95®.

It is understood that the exemplary system, if converged with other electronic systems, such as a gaming system or video telephone system, could also operate exclusively in a gaming mode or video telephone mode. When exclusively in a mode, the inventors do not intend to be operating within a window of the computer operating system, but instead as if the system appeared to the user to be a dedicated machine. By stating this, one must understand that when in PC mode a video window application, or gaming window application or video phone window application can be implemented, but when operating in a window the PC is not acting as a dedicated machine to any single application.

The wireless computer keyboard of the exemplary embodiment will have functions, such as channel-up, channel-down, volume-up and volume-down mapped into the system. A user of the exemplary PC/TV system can use the wireless computer keyboard to operate both the personal computer and the remote control operations associated with the television mode of the system.

The advantage of a wireless computer keyboard configured to have remote control functionality mapped into it is that a user could be working on or preparing a document in PC mode and decide to switch to TV mode. At this time, the user would not have to put the wireless computer keyboard down, then find and pick up the television remote control to operate the system in TV mode. Instead, the wireless keyboard could be used as the television remote control as well. Channels could be changed, volume could be adjusted, etc.

Preferably, the user could either press a designated key on the keyboard or hold down a particular function key while pressing another predetermined key to send remote control signals to the IR receiver on the CPU or on the television.

A variation would require that the wireless keyboard emit IR signals to an IR receiver on the monitor 22. The monitor may translate the received IR signals into codes that are understood by the CPU. The codes are sent from the monitor to the CPU and are acted on accordingly. For example, the codes could be "make" and "break" codes for use by the CPU. The codes could be the result of a designated key or key combination that require the wireless keyboard to send a "universal remote" IR signal such as channel-up or that requires the remote to send a make-break style signal to the CPU which translates the keyboard style signal and requests the converged TV system to act accordingly.

In the exemplary embodiment, the wireless keyboard can send remote control signals that are substantially identical or interpreted to be the equivalent of various IR signals transmitted by an RCA television remote control. In particular, there may be fifteen keys designated on the wireless remote control as multifunction keys. There is a function key that does not generate any IR transmission when pressed, but if pressed in combination with one of the fifteen multifunction keys the wireless computer keyboard will transmit a remote control signal.

A specific example is now explained. When an up arrow is pressed on the wireless computer keyboard, a cursor that is present on the monitor may move in an upward direction, but if the function key is pressed, and then the up-arrow key is pressed, the volume associated with the television may increase.

In another embodiment of the present invention, the IR signal sent from the keyboard to an IR receiver associated with the PC/TV system are not the same as the signals sent by a standard TV remote, but instead the IR signals associated with the TV related functions are specifically formatted to be interpreted and translated by the IR receiver then be provided to the CPU which in turn controls the TV function such as channel-up or volume-down.

Referring now to TABLE A, there is an exemplary chart describing the mapping of various TV remote control functions on to a wireless computer keyboard. For example, if the function key plus the F1 key is held down, a main menu will appear on the monitor. If the function key plus F2 is held down, then a TV program guide will be displayed. If the function key plus F3 is held down, the exemplary PC/TV system will toggle between TV and PC modes. If the function key and F4 are pressed, the TV volume will be muted. If the function key plus F5 is held down, the channel will change (go back) to the previous TV channel that the user was watching. Pressing the function key and F6 will open a picture-in-a-picture window (PIP) on the TV screen. Pressing the function key plus F7 swaps the PIP with the main picture on the screen. Pressing the function key plus F8 "freezes" the picture.

Pressing the function key plus F9 switches the input device to the tuner. For example, the exemplary embodiment includes three inputs so that maybe a VCR, a laser disk player, or a gaming device can be connected to the system. Pressing the function key plus F10 turns the system to a low power or off state. Pressing the function key plus F11 changes the channel of the PIP. Pressing the function key plus F12 changes the PIP size. Pressing the function key plus the [pause] key could be used to reset the system.

Pressing the function key plus the up-arrow or down-arrow keys changes the channel up or down respectively. Pressing the function key plus either the left or right arrow keys can change the volume up or down.

TABLE A

| Function Key + | Remote Control Key Mimicked |
| --- | --- |
| F1 | ICON/MAIN MENU |
| F2 | GUIDE |
| F3 | TV-PC |
| F4 | MUTE |
| F5 | GO BACK |
| F6 | PIP |
| F7 | PIP-SWAP |
| F8 | FREEZE |
| F9 | INPUT |
| F10 | POWER |
| F11 | ChCtrl |
| F12 | SIZE |
| Pause | [RESET] |
| Up Arrow | CH (up) |
| Down Arrow | CH (dn) |

TABLE A-continued

| Function Key + | Remote Control Key Mimicked |
|---|---|
| Right Arrow | VOL (up) |
| Left Arrow | VOL (dn) |

Figure 3:
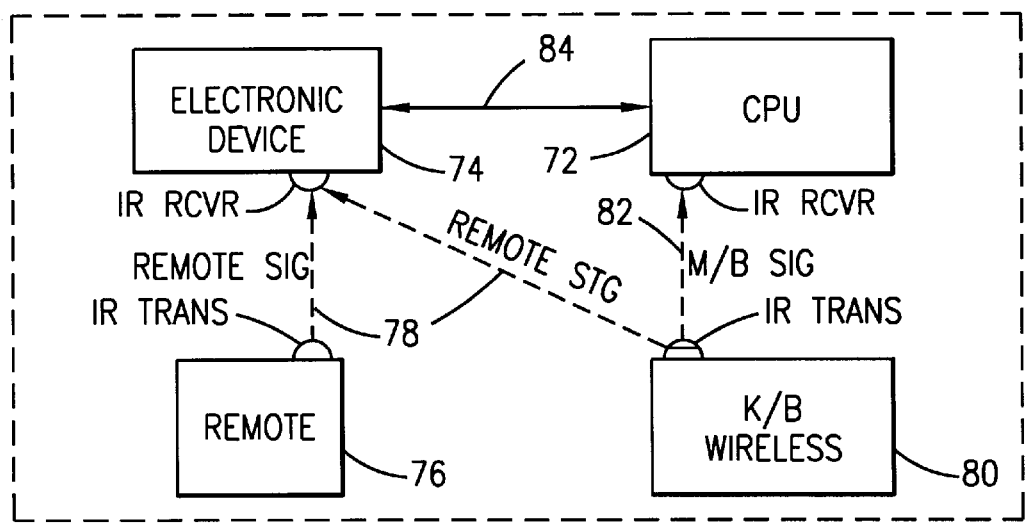
FIG. 3 is a diagram of a third embodiment of the present invention.

Referring now to FIG. 3, another exemplary computer system converged with another electronic device in accordance with the present invention 70 is shown. A CPU 72 is connected or placed in communication with an electronic device 74 or system that may be remotely controllable by a remote control 76.

The remote control 76 transmits IR remote control signals 78 that are formatted such that the electronic device 74 can interpret the signals and be controlled by the remote 76. Furthermore, the wireless computer keyboard 80 can send computer keyboard style make-break IR signals to the CPU 72. These make-break signals 82 are interpreted by the CPU 72 to perform a predetermined function. The make-break signals can be interpreted by the CPU 72 such that the CPU transmits a signal over the bus 84 to the electronic device 74. The electronic device may perform a predetermined function (such as channel-up) in response thereto. Thus, a remote control function is mapped into the wireless computer keyboard 80.

Furthermore, the wireless computer keyboard 80 of FIG. 3, in addition to sending make-break computer keyboard signals 82 to the CPU 72, could be adapted to transmit remote control signals 78 directly to the electronic device 74 when a predetermined key or key combination is pressed on the wireless computer keyboard 80.

Figure 4:
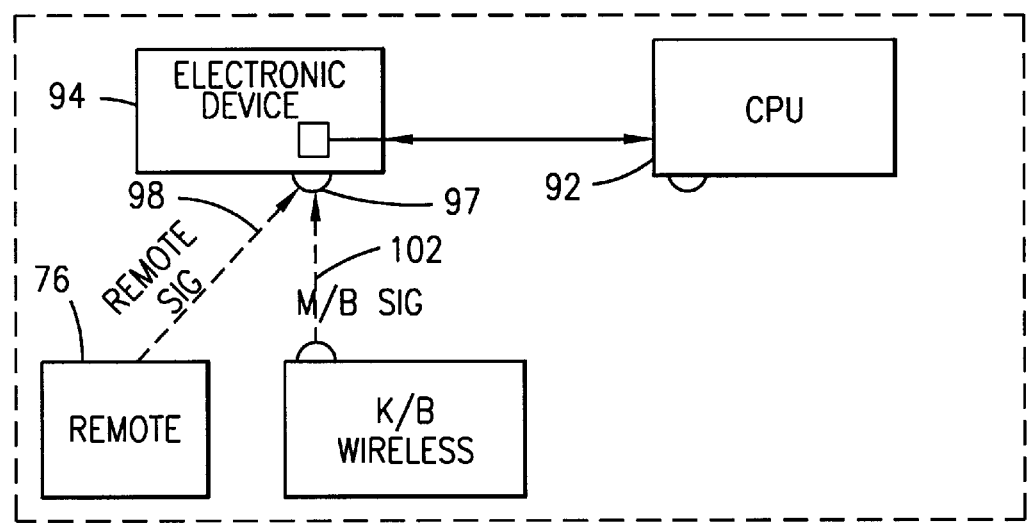
FIG. 4 is a diagram of a fourth embodiment of the present invention.

In another embodiment of the present invention, shown in FIG. 4, a computer is converged with another electronic device 90. A CPU 92 is in bidirectional communication with the electronic device 94. A remote control 96, associated with the electronic device 94, transmits remote control IR signals to an IR receiver 97 associated with the electronic device and the CPU 92 in order to control the electronic device. Furthermore, a wireless computer keyboard 100 transmits make-break computer keyboard codes 102 to the IR receiver 97 wherein the make-break signals are interpreted and sent to the CPU 92 via a bidirectional bus 104. Furthermore, the wireless keyboard has remote control functions associated with the electronic device 94 mapped onto the keyboard. The wireless keyboard 100 is either adapted to send IR remote control signals or to send make-break signals. The IR receiver interprets the "signals" sent from the wireless keyboard and determines if they are intended for the remotely controlled electronic device 94 or for the CPU 92. Thus, remote control signals are mapped into the wireless computer keyboard so that the remotely controllable electronic device can be controlled by either the remote control 96 or the wireless computer keyboard 100.

The converged electronic device 74 and 94 of FIGS. 3 and 4 are preferably a monitor or television, but could be a variety of remotely controllable, electronic devices including, but not limited to, a VCR, a sound system, a stereo system, a digital disc player, a video game system, a video telecommunication system, and a home environment remote control system.

Furthermore, although the exemplary embodiments described above indicate infrared transmission for the remote control and/or wireless keyboard, it is understood that radio frequency, electromagnetic signals, sound waves (including audible and inaudible sounds) or other wireless communication transmitters and receivers can be used in the present exemplary embodiments with equivalent results. That is, the wireless keyboard can be used to control a plurality of electronic devices without having to use the remote control designated for the remotely controllable device.

It is also possible in another exemplary embodiment of the present invention to allow the user to program the wireless computer keyboard via at least one of a variety of programmable techniques. Such techniques include, but are not limited to, downloading remote control signals into an IR receiver associated with the wireless keyboard, updating a remote control signal database associated with the IR receiver and/or the CPU and/or the electronic device, or inserting memory modules into the wireless keyboard which contain information designated IR transmissions for predetermined key presses.

A person of ordinary skill in the art would understand and appreciate the multitude of variations with respect to mapping remote control commands into a wireless computer keyboard and/or transmitting the remote control signals from the wireless computer keyboard to control both a computer and at least one other remotely controllable electronic system that may or may not be converged with the computer. Thus, a few of the preferred exemplary embodiments of the present invention have been shown and described. It would be appreciated by those skilled in the art that changes may be made in the disclosed embodiments without departing from the principles and spirit of the invention, the scope of which is defined in the appended claims.

What is claimed is:

1. A computer system, comprising:

a computer;

a remotely controllable device connected to said computer;

a receiving device for receiving a plurality of wireless commands associated with at least one of said computer and said remotely controllable device; and a wireless computer keyboard, having commands to control functions related to said remotely controllable device mapped therein, adapted to provide a first wireless command intended for said computer and a second wireless command intended for said remotely controllable device.

2. The computer system of claim 1, wherein said first wireless command comprises at least a make data and a break data.

3. The computer system of claim 1, wherein said second wireless command comprises at least a code understood by said remotely controllable device.

4. The computer system of claim 1, wherein said wireless keyboard is programmable to provide a third wireless command when a predetermined button on said wireless keyboard is pressed.

5. The computer system of claim 1, wherein said wireless computer keyboard comprises an infrared transmitter for providing said first wireless command.

6. The computer system of claim 1, wherein said wireless computer keyboard comprises an infrared transmitter for providing said second wireless command.

7. The computer system of claim 1, wherein said remotely controllable device is adapted to be in communication with said computer.

8. The computer system of claim 1, wherein said computer and said remotely controllable device are converged as a single system.

9. A computer system comprising:

a central processing unit;

a receiver for receiving wireless commands, said receiver being connected to said central processing unit;

a monitor connected to said central processing unit;

a wireless computer keyboard adapted to transmit wireless commands to said receiver, said wireless computer keyboard adapted to transmit a wireless computer keyboard command and adapted to transmit an equivalent of a predetermined remote control command; and a remotely controllable device connected to the computer system wherein said predetermined remote control command controls said remotely controllable device.

10. The computer system of claim 9, wherein said wireless computer keyboard command comprises a first data indicating a predetermined key has been pressed and a second data indicating that said predetermined key has been depressed.

11. The computer system of claim 9, comprising a remotely controllable device converged with said personal computer.

12. The computer system of claim 9, wherein said wireless commands are infrared transmissions.

13. A method of using a computer and controlling a remotely controllable device from a wireless computer keyboard, comprising the steps of:

pressing and depressing a first key on said wireless computer keyboard;

transmitting a first signal from said wireless computer keyboard;

receiving said first signal at a first receiver associated with said computer, said computer performing a first function based on the receipt of said first signal;

pressing and depressing at least one of a second key and a key combination on said wireless computer keyboard;

transmitting a second signal from said wireless computer keyboard; and receiving said second signal at said first receiver, said second signal being formatted differently than said first signal, said remotely controllable device performing a second function based on the receipt of said second signal.

14. The method of claim 13, wherein said remotely controllable device is converged with said computer.

15. The method of claim 13, wherein said first signal is an infrared signal.

16. The method of claim 13, wherein said remotely controllable devices performs a third function based on the receipt of said first signal.

17. A method of using a computer and controlling a remotely controllable device from a wireless computer keyboard, comprising the steps of:

pressing and depressing a first key on said wireless computer keyboard;

transmitting a first signal from said wireless computer keyboard;

receiving said first signal at a first receiver associated with said computer, said computer performing a computer function based on the receipt of said first signal;

pressing and depressing at least a second key on said wireless computer keyboard;

transmitting a second signal from said wireless computer keyboard; and receiving said second signal at said first receiver, said second signal being interpreted to control a remotely controllable device associated with said computer.

* * * * *